(No Model.) 2 Sheets—Sheet 1.
J. W. CHISHOLM.
CAR COUPLING.
No. 390,345. Patented Oct. 2, 1888.
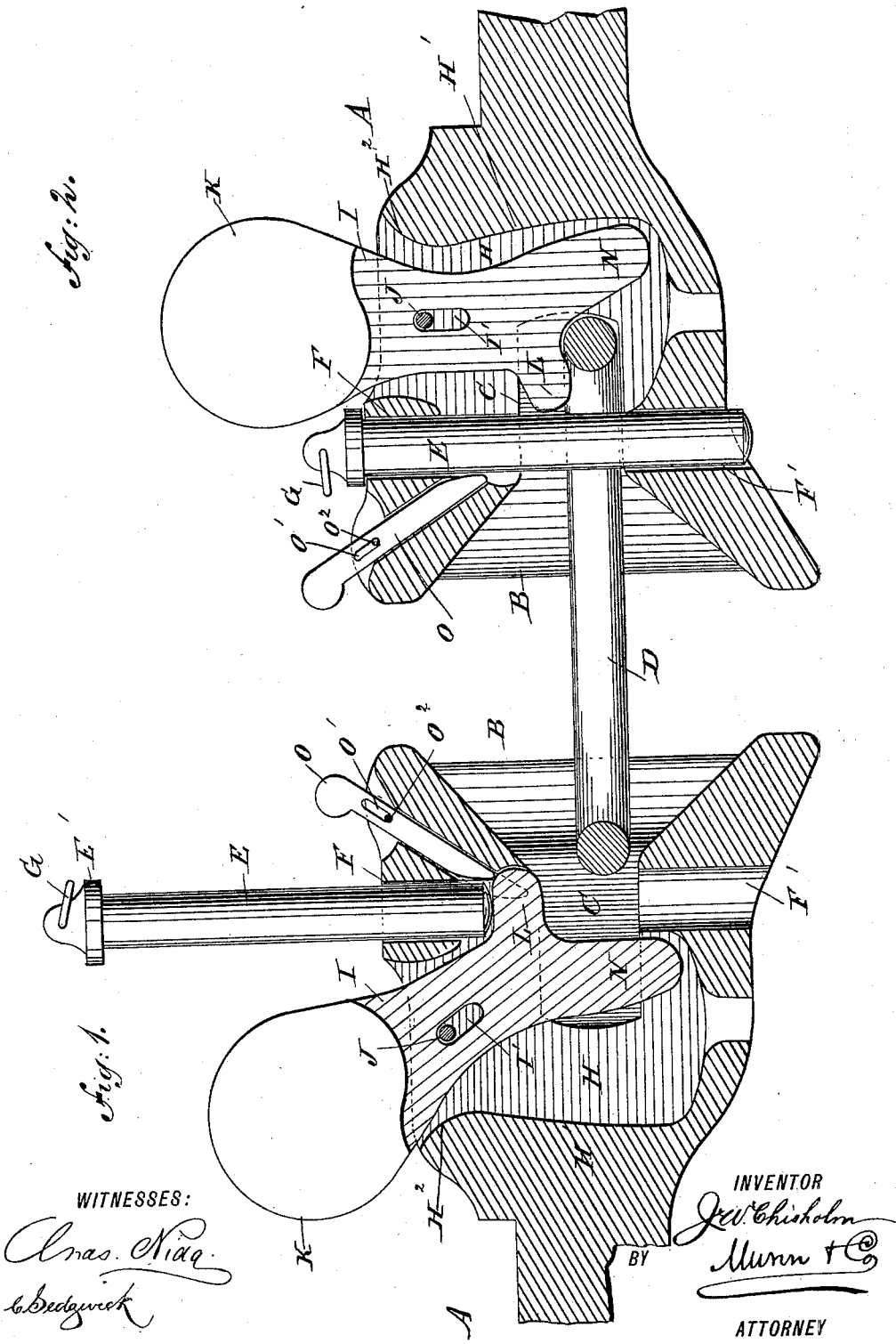
WITNESSES:
Chas. Nidd.
C. Sedgwick
INVENTOR
J. W. Chisholm
BY Munn & Co.
ATTORNEY (No Model.)
J. W. CHISHOLM.
CAR COUPLING.
No. 390,345. Patented Oct. 2, 1888.
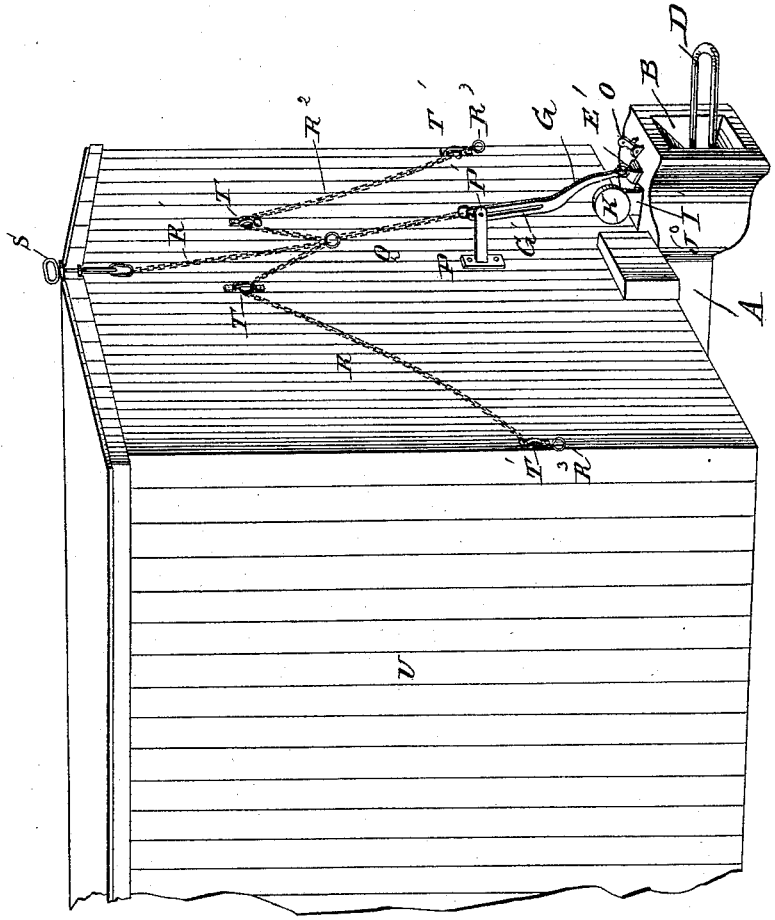

UNITED STATES PATENT OFFICE.

JOHN W. CHISHOLM, OF LIVERPOOL, NOVA SCOTIA, CANADA.

CAR-COUPLING.

SPECIFICATION forming part of Letters Patent No. 390,345, dated October 2, 1888.

Application filed May 9, 1888. Serial No. 273,292. (No model.)

*To all whom it may concern:*

Be it known that I, JOHN W. CHISHOLM, of Liverpool, in the county of Queens, Province of Nova Scotia, and Dominion of Canada, have invented a new and Improved Car-Coupler, of which the following is a full, clear, and exact description.

The object of the invention is to provide a new and improved car-coupler which is simple and durable in construction and very effective and automatic in operation.

The invention consists of certain parts and details and combinations of the same as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of the improvement shown in position to receive the coupling-link. Fig. 2 is a like view of the same holding the coupling-link, and Fig. 3 is a perspective view of the improvement as applied to one end of a car.

The draw-head A is held in the usual manner on the car and is provided in its front with an opening, B, continuing into the recess C, into which passes the coupling-link D, adapted to be engaged by a coupling-pin, E, held to slide vertically in the apertures F and F', formed in the said draw-head A. In the draw-head A is also formed a recess, H, narrower than the recess C and containing the dog I, provided near its middle with a slot, I', through which passes the pin J, secured in the draw-head A. The dog I turns on the said pin J, and is provided at its upper end with a weight, K, preferably made in the form of a ball or a disk and extending a short distance above the top of the draw-head A. On the lower end of the dog I are formed the two noses or offsets L and N, of which the former extends horizontally and is adapted to support the coupling-pin E, as illustrated in Fig. 1, while the other nose or offset, N, extends downward and is adapted to be operated on by the coupling D, as shown in Fig. 2. The rearward swinging motion of the dog I is limited by the wall H' of the recess H, and the downward swinging motion of the dog I is limited by the upper end of the said dog I resting on the top end, H², of the said wall H', as is plainly shown in Fig. 1.

In the front end of the draw-head A is held to slide in an inclined slot a key, O, provided with a slot, O', through which passes a pin, O², secured in the draw-head A. The lower end of the key O is adapted to pass into the lower end of the aperture F, in which is held the coupling-pin E, and the said key O serves to hold the coupling-pin E temporarily in position when the dog I stands in a vertical position and the operator desires to hold the pin E in its outermost position by the said key O, which then assumes the position shown in dotted lines in Fig. 1.

On the upper end of the coupling-pin E is formed the usual head, E', pivotally connected with the lower end of an arm, G, extending upward and provided in its upper end with a slot, G', through which passes a pin, P', secured in a bracket, P, fastened to the front end of the car U, supporting the draw-head A. The upper end of the arm G is connected with one end of a chain, Q, which extends upward and is connected with the three chains R, R', and R², of which the chain R' extends upward and is connected with a rod, S, held to slide in suitable bearings on the roof of the car U. The chains R and R² pass over pulleys T and T', of which the latter are secured near the sides of the car, as is plainly shown in Fig. 3. On the outer end of each of the chains R and R² is formed a ring or handle, R³, for conveniently operating said chains R and R².

The operation is as follows: The coupling-pin E can be drawn to its uppermost position, as shown in Fig. 1, by pulling either on the rings or handles R³ of the chains R and R² or on the rod S, so as to lift the arm G until the pin P' strikes the lower end of the slot G'. The dog I is then in the position shown in Fig. 1, whereby the nose L passes into the lower end of the aperture F and supports the pin E. The link D is held in the opposite draw-head, A, by the nose L resting on the inner end of the said link D, as shown in Fig. 2, the dog I then being in a vertical position, as illustrated in said figure. When the cars are moved toward each other, the coupling-link D passes at its outer end into the recess C of the draw-head A, (shown in Fig. 1,) and the said link D comes in contact with the nose N and moves the same rearwardly, whereby the nose L of the dog I swings from under the coupling-pin E, so that the latter is free to drop downward until its head E' rests on the top of the draw-head A and the lower end has passed into the opening F'. The pin E also passes, in its downward movement, through the coupling-link D in the usual manner, so that the cars are coupled.

When the operator desires to uncouple the cars, the pin E of the other car is drawn upward, as above described, whereby the said pin E disengages the link D and the latter can be withdrawn by backing up the other car. The dog I then falls into its rearward position, as shown in Fig. 1, on account of the weight K hanging slightly rearward, so that the nose L again passes into the lower end of the aperture F and there supports the pin E.

When the conductor or brakeman desires to cut out a car in a train of cars, he can support the pin E temporarily by leaving the dog I in the position shown in Fig. 2, raising the pin E and letting the key O slide downward, so that the lower end passes into the lower end of the opening F, thereby supporting the pin E. When the draw-head now comes in contact with an obstruction—that is, the draw-head of another car—the dog I swings rearward at its upper end, so that its nose L strikes against the lower end of the key O and moves the latter upward into its former position, as shown in Figs. 1 and 2. The nose L then supports the pin E in the manner above described.

Having thus fully described my invention, I claim as new and desire to secure by Letters Patent—

1. In a car-coupling, the combination, with a draw-head, of a dog provided with a slot at about the middle, through which the pivot-pin passes, a weight at its upper end, a downwardly-extending nose at its lower end, and a horizontally-extending nose a short distance from said lower end, substantially as and for the purpose set forth.

2. In a car-coupling, the combination, with the draw-head, of a dog pivoted in the said draw-head and provided at its outer end with a weight and on its inner end with two noses or offsets, of which one is adapted to support the coupling-pin and the other is operated on by the coupling-link, and a key held to slide loosely in an inclined slot in the said draw-head and adapted to support temporarily the coupling-pin, substantially as shown and described.

3. In a car-coupler, a draw-head, a coupling-link, and a coupling-pin held to slide in the said draw-head, in combination with a dog pivoted in the said draw-head to swing forward and backward, and provided at its upper end with a weight and at its lower inner end with two offsets, of which one is adapted to support the said coupling-pin and the other is operated on by the said coupling-link, and a pin held to slide in an inclined slot in the said draw-head and being adapted to support temporarily the said coupling pin, substantially as shown and described.

JOHN W. CHISHOLM.

Witnesses:
THEO. G. HOSTER,
C. SEDGWICK.